United States Patent
Oyabu

(10) Patent No.: US 10,930,147 B2
(45) Date of Patent: Feb. 23, 2021

(54) ELECTRONIC APPARATUS, ROADSIDE UNIT, AND TRANSPORT SYSTEM

(71) Applicant: KYOCERA Corporation, Kyoto (JP)

(72) Inventor: Takahiro Oyabu, Hachioji (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/662,155

(22) Filed: Oct. 24, 2019

(65) Prior Publication Data

US 2020/0058220 A1 Feb. 20, 2020

Related U.S. Application Data

(63) Continuation of application No. PCT/JP2018/016124, filed on Apr. 19, 2018.

(30) Foreign Application Priority Data

Apr. 26, 2017 (JP) .............................. JP2017-087319

(51) Int. Cl.
*G08G 1/09* (2006.01)
*H04W 4/44* (2018.01)
*H04W 4/029* (2018.01)
*H04W 12/00* (2009.01)
*G08G 1/01* (2006.01)
*H04M 11/00* (2006.01)
*H04W 48/10* (2009.01)

(52) U.S. Cl.
CPC .............. *G08G 1/09* (2013.01); *G08G 1/01* (2013.01); *H04M 11/00* (2013.01); *H04W 4/029* (2018.02); *H04W 4/44* (2018.02); *H04W 12/00503* (2019.01); *H04W 48/10* (2013.01)

(58) Field of Classification Search
None
See application file for complete search history.

(56) References Cited

U.S. PATENT DOCUMENTS

| | | | |
|---|---|---|---|
| 2008/0242278 A1 | 10/2008 | Rekimoto | |
| 2015/0131637 A1* | 5/2015 | Rubin | G08G 1/0969 370/337 |
| 2017/0345298 A1* | 11/2017 | Tandai | H04W 56/0025 |
| 2018/0152250 A1* | 5/2018 | Yamasaki | H04W 4/40 |
| 2020/0058220 A1* | 2/2020 | Oyabu | G08G 1/09 |

FOREIGN PATENT DOCUMENTS

| | | | |
|---|---|---|---|
| JP | 2008-252298 A | 10/2008 | |
| JP | 2012-098826 A | 5/2012 | |
| JP | 2015039089 A | 2/2015 | |
| JP | 2016067028 A | 4/2016 | |
| WO | WO-2011089641 A1 * | 7/2011 | G08G 1/162 |
| WO | 2012/056688 A1 | 5/2012 | |
| WO | WO-2015162851 A1 * | 10/2015 | G07C 5/008 |

* cited by examiner

*Primary Examiner* — Fekadeselassie Girma

(74) *Attorney, Agent, or Firm* — Studebaker & Brackett PC

(57) ABSTRACT

An electronic apparatus comprises a communication unit and at least one processor. The communication unit wirelessly communicates with a roadside unit and a vehicle. When receiving through the communication unit a reception signal transmitted from the roadside unit, the at least one processor determines whether to restrain transmission of a transmission signal through the communication unit, based on the reception signal.

10 Claims, 9 Drawing Sheets

ELECTRONIC APPARATUS, ROADSIDE UNIT, AND TRANSPORT SYSTEM

CROSS-REFERENCE TO RELATED APPLICATIONS

The present application is a continuation based on PCT Application No. PCT/JP2018/016124 filed on Apr. 19, 2018, which claims the benefit of Japanese Application No. 2017-087319 filed on Apr. 26, 2017. PCT Application No. PCT/JP2018/016124 is entitled "ELECTRONIC DEVICE, ROADSIDE DEVICE, METHOD FOR OPERATION OF ELECTRONIC DEVICE, AND TRAFFIC SYSTEM", and Japanese Application No. 2017-087319 is entitled "ELECTRONIC APPARATUS, ROADSIDE MACHINE, OPERATION METHOD, AND CONTROL PROGRAM, AND TRAFFIC SYSTEM", the contents of which are incorporated by reference herein in their entirety.

FIELD

Embodiments of the present disclosure generally relate to an electronic apparatus, a roadside unit, and a transport system.

BACKGROUND

Various technologies on electronic apparatuses have been proposed.

SUMMARY

An electronic apparatus and a roadside unit are disclosed. The electronic apparatus comprises a communication unit and at least one processor. The communication unit wirelessly communicates with a roadside unit and a vehicle. When receiving through the communication unit a reception signal transmitted from the roadside unit, the at least one processor determines whether to restrain transmission of a transmission signal through the communication unit, based on the reception signal.

In another embodiment, a roadside unit comprises a communication unit and at least one processor. The communication unit wirelessly communicates with an electronic apparatus and a vehicle. The at least one processor sets a restraining area in which the electronic apparatus restrains transmission of a signal, and transmits, to the electronic apparatus through the communication unit, restraining area information indicating the restraining area.

DETAILED DESCRIPTION

Embodiment 1

Figure 1:
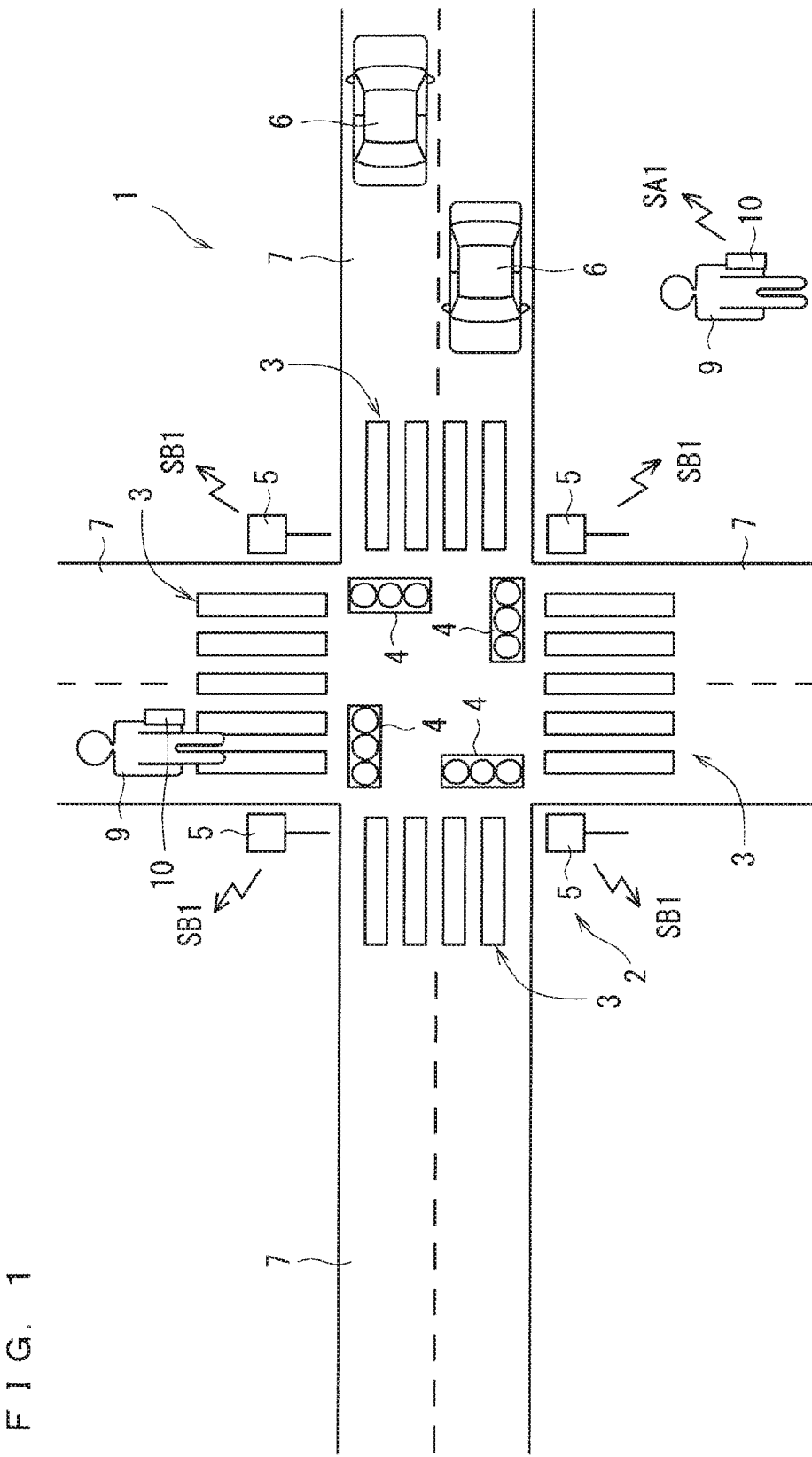
FIG. 1 schematically illustrates one example system in which electronic apparatuses are used.

FIG. 1 illustrates one example system in which electronic apparatuses 10 are used. The electronic apparatuses 10 are, for example, mobile electronic apparatuses such as smartphones. The electronic apparatuses 10 can be used in, for example, an intelligent transport system (ITS), specifically, a driving safety support communication system 1. The driving safety support communication system 1 is also referred to as a driving safety support system or a driving safety support wireless system.

In the driving safety support communication system 1, roadside units 5 located at, for example, an intersection 2, vehicles 6 such as automobiles traveling through a road 7, and the electronic apparatuses 10 carried by users 9 who are pedestrians can wirelessly communicate with one another as illustrated in FIG. 1. Consequently, the roadside units 5, the vehicles 6, and the electronic apparatuses 10 can exchange information with one another. A plurality of the vehicles 6 can wirelessly communicate with each other. Consequently, the plurality of vehicles 6 can exchange information with each other. The communication between the roadside unit 5 and the vehicle 6, the communication between the vehicles 6, the communication between the roadside unit 5 and the electronic apparatus 10 of the pedestrian, and the communication between the electronic apparatus 10 of the pedestrian and the vehicle 6 are referred to as road-to-vehicle communications, inter-vehicle communications, road-to-pedestrian communications, and pedestrian-to-vehicle communications, respectively.

The roadside units 5 can notify the vehicles 6 and the electronic apparatuses 10 of, for example, information on lighting of traffic lights 4 and information on road restriction. The roadside units 5 can detect the vehicles 6 and persons (e.g., pedestrians) nearby. The roadside units 5 located at the intersection 2 can detect, for example, the pedestrian who crosses a pedestrian crossing 3. The roadside units 5 can notify the vehicles 6 and the electronic apparatuses 10 of information on the vehicles 6 and the pedestrian that have been detected. The roadside units 5 can notify information notified from the vehicle 6 and the electronic apparatus 10, to the other vehicles 6 and the other electronic apparatuses 10.

The vehicle 6 can notify the other vehicles 6, the roadside units 5, and the electronic apparatuses 10 of information on, for example, the position, the speed, and the blinkers of its own vehicle. Then, the vehicle 6 can support driving safety of a driver through making various notifications including warnings to the driver based on the information notified from the roadside units 5 or the electronic apparatuses 10. The vehicle 6 can make the various notifications to the driver using, for example, a speaker and a display.

The electronic apparatus 10 can notify the roadside units 5 and the vehicles 6, etc., of, for example, information indicating its own position. The vehicles 6 may notify the drivers of the existence of the users 9 upon receipt of the information. Consequently, the drivers can drive the vehicles while paying attention to the users 9.

As such, the driving safety support communication system 1 supports the driving safety of the drivers of the vehicles 6 through road-to-vehicle communications, inter-vehicle communications, road-to-pedestrian communications, and pedestrian-to-vehicle communications.

In this driving safety support communication system 1, for example, a communication bandwidth of one channel with 9 MHz width in the 760 MHz band may be used. In other words, the roadside units 5, the vehicles 6, and the electronic apparatuses 10 may communicate with one another using this communication bandwidth. When the channels are few in number, it is not preferred that one device (e.g., the electronic apparatus 10) occupies the communication bandwidth over a long period of time. This is because the other devices (e.g., the other electronic apparatuses 10) cannot transmit information. For example, when the electronic apparatuses 10 cannot transmit information, the vehicles 6 can neither receive the information of the electronic apparatuses 10 nor perform an operation based on the information.

Thus, Embodiment 1 aims at appropriately reducing the communication volume of the driving safety support communication system 1.

Figure 2:
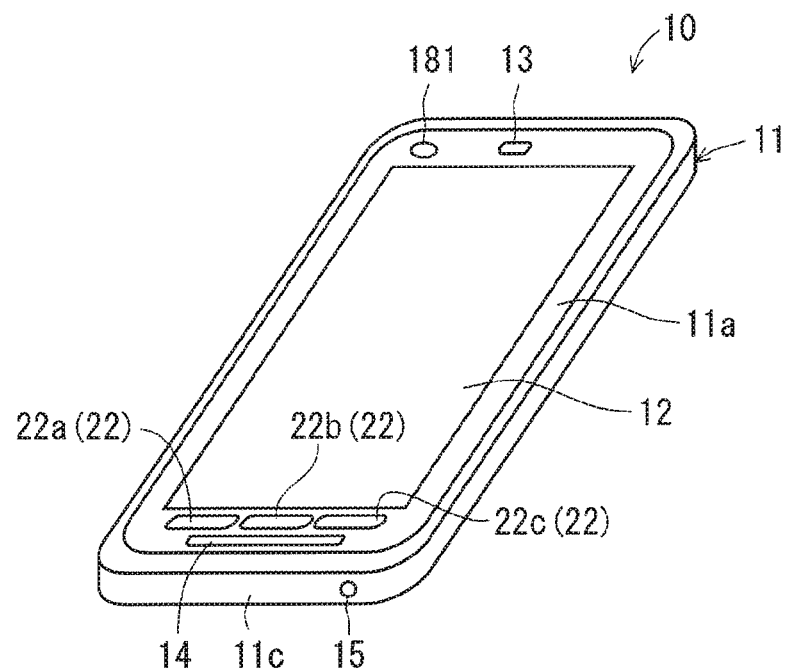
FIG. 2 schematically illustrates one example external appearance of an electronic apparatus.
Figure 3:
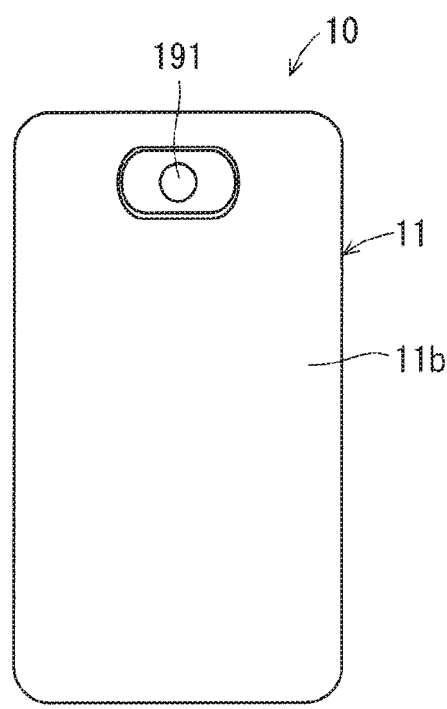
FIG. 3 schematically illustrates one example external appearance of the electronic apparatus.

FIG. 2 and FIG. 3 illustrate a perspective view and a rear view, respectively, to schematically show one example external appearance of the electronic apparatus 10. As illustrated in FIGS. 2 and 3, the electronic apparatus 10 comprises an apparatus case 11 that is formed of, for example, an approximately rectangular plate in a plan view. The apparatus case 11 forms the exterior of the electronic apparatus 10.

A front surface 11a of the apparatus case 11 comprises a display region 12 in which various pieces of information such as characters, symbols, and graphics are displayed. A touch panel 130 is located on the back of the display region 12 (see FIG. 4 to be described later). This enables the user 9 to enter the various pieces of information into the electronic apparatus 10 by operating the display region 12 on the front surface of the electronic apparatus 10 using, for example, the finger. The user 9 can enter the various pieces of information into the electronic apparatus 10 also by operating the display region 12 with an operator other than the finger, for example, pens for touch panels including a stylus pen.

A receiver hole 13 is located at an upper end portion of the front surface 11a of the apparatus case 11. A speaker hole 14 is located at a lower end portion of the front surface 11a of the apparatus case 11. A microphone hole 15 is located at a lower side surface of the apparatus case 11.

A lens 181 of a first camera 180 to be described later is visible at the upper end portion of the front surface 11a of the apparatus case 11. As illustrated in FIG. 3, a lens 191 of a second camera 190 to be described later is visible at the upper end portion of a back surface 11b of the apparatus case 11.

The electronic apparatus 10 comprises an operation button group 220 (see FIG. 4 to be described later) consisting of a plurality of operation buttons 22. Each of the operation buttons 22 is a hardware button. Specifically, each of the operation buttons 22 is a press button. At least one of the operation buttons 22 of the operation button group 220 may be a software button to be displayed in the display region 12.

The operation button group 220 comprises operation buttons 22a, 22b and 22c located at the lower end portion of the front surface 11a of the apparatus case 11. The operation button group 220 also comprises a power button and a volume button which are located on the surface of the apparatus case 11 and are not shown.

The operation button 22a is, for example, a back button. The back button is an operation button for switching the display in the display region 12 to the immediately preceding display. The user 9 operates the operation button 22a to switch the display in the display region 12 to the immediately preceding display. The operation button 22b is, for example, a home button. The home button is an operation button for displaying the home screen in the display region 12. The user 9 operates the operation button 22b to display the home screen in the display region 12. The operation button 22c is, for example, a history button. The history button is an operation button for displaying, in the display region 12, the histories of applications executed by the electronic apparatus 10. The user 9 operates the operation button 22c to display, in the display region 12, the histories of the applications executed by the electronic apparatus 10.

Figure 4:
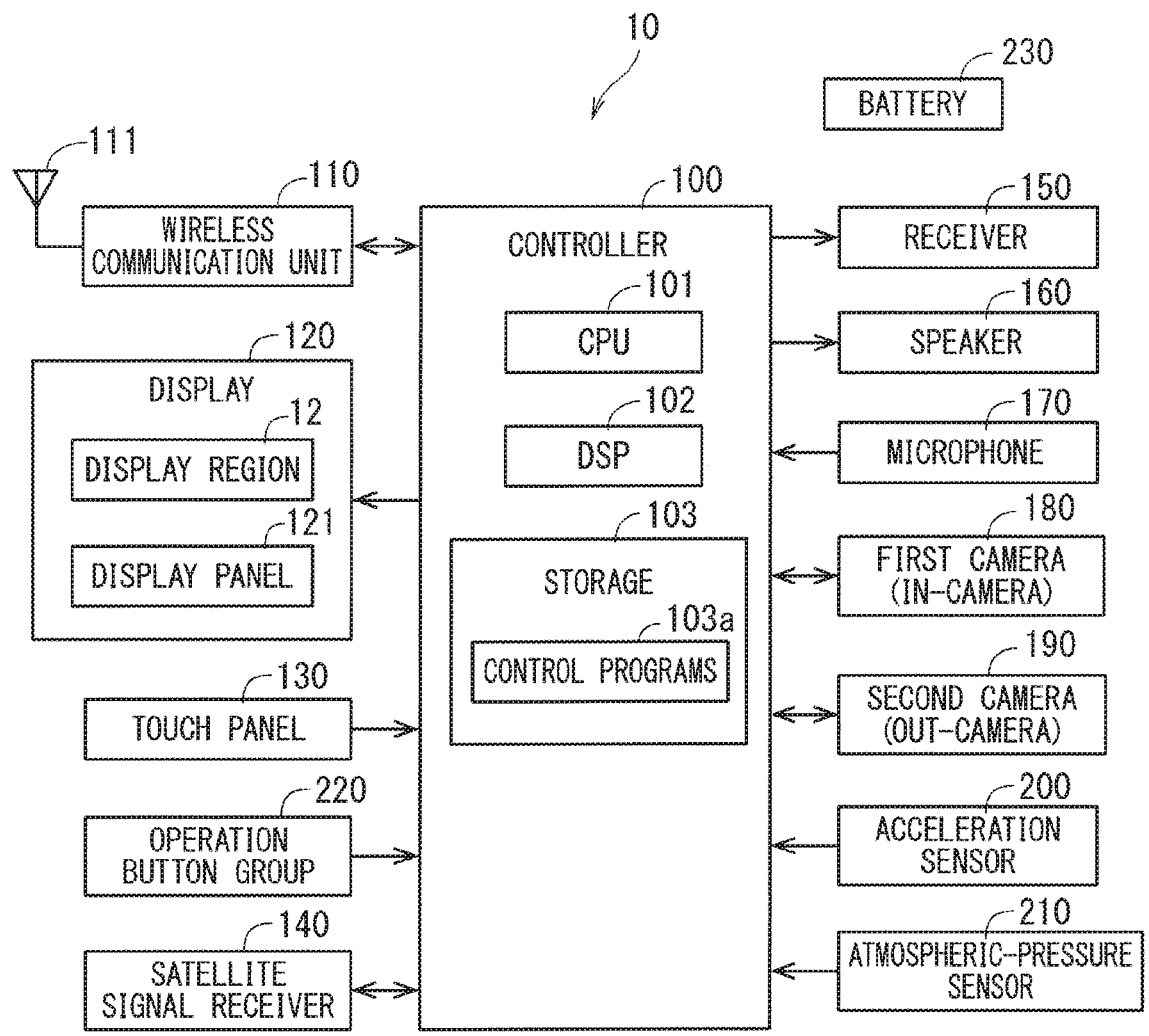
FIG. 4 illustrates a block diagram schematically showing one example electrical configuration of the electronic apparatus.

FIG. 4 illustrates a block diagram schematically showing one example electrical configuration of the electronic apparatus 10. As illustrated in FIG. 4, the electronic apparatus 10 comprises a controller 100, a wireless communication unit 110, a display 120, the touch panel 130, and the operation button group 220. The electronic apparatus 10 further comprises a satellite signal receiver 140, a receiver 150, a speaker 160, a microphone 170, the first camera 180, the second camera 190, an acceleration sensor 200, an atmospheric-pressure sensor 210, and a battery 230. The apparatus case 11 contains these components of the electronic apparatus 10.

The controller 100 can manage the overall operations of the electronic apparatus 10 by controlling the other components of the electronic apparatus 10. The controller 100 is also referred to as a control circuit. The controller 100 comprises at least one processor for providing control and processing capability to implement various functions as will be further described in detail below.

In accordance with various embodiments, the at least one processor may be implemented as a single integrated circuit (IC) or as multiple communicatively coupled ICs and/or discrete circuits. The at least one processor can be implemented in accordance with various known technologies.

In one embodiment, the processor comprises, for example, one or more circuits or units configured to perform one or more data computing procedures or processes by executing instructions stored in an associated memory. In the other embodiments, the processor may be implemented as firmware (e.g., discrete logic components) configured to perform one or more data computing procedures or processes.

In accordance with the various embodiments, the processor may comprise one or more processors, controllers, microprocessors, microcontrollers, application specific integrated circuits (ASICs), digital signal processors, programmable logic devices, field programmable gate arrays, any combination of these devices or structures, or a combination of the other known devices and structures, to implement the functions to be described hereinafter.

In this example, the controller 100 comprises a central processing unit (CPU) 101, a digital signal processor (DSP) 102, and storage 103. The storage 103 comprises a non-transitory recording medium that can be read by the CPU 101 and the DSP 102, such as a read only memory (ROM) and a random access memory (RAM). The ROM in the storage 103 is, for example, a flash ROM (flash memory) that is a non-volatile memory. For example, a plurality of control programs 103*a* for controlling the electronic apparatus 10 are stored in the storage 103. The CPU 101 and the DSP 102 execute the various control programs 103*a* in the storage 103 to implement the various functions of the controller 100.

All or part of the functions of the controller 100 may be implemented by a hardware circuit that does not require software for implementing the functions. The storage 103 may comprise a non-transitory computer-readable recording medium other than the ROM and the RAM. The storage 103 may comprise, for example, a compact hard disk drive and a solid-state drive (SSD).

The plurality of control programs 103*a* in the storage 103 contain various applications (application programs). For example, a call application for performing a voice call and a video call, a browser for displaying a website, and a mail application for creating, browsing, sending, and receiving an e-mail are stored in the storage 103. Furthermore, a camera application for capturing images of an object using the first camera 180 and the second camera 190, a recorded-image display application for displaying static and dynamic images recorded in the storage 103, and a music-playback control application for controlling the playback of music data stored in the storage 103, etc., are stored in the storage 103. At least one of the applications in the storage 103 may be previously stored in the storage 103. The electronic apparatus 10 may download the at least one of the applications in the storage 103 from another device, and then store the application in the storage 103.

The electronic apparatus 10 may comprise storage different from the storage 103. The aforementioned information to be stored in the storage 103 or information to be stored in the storage 103 which will be described below may be stored in the different storage.

The wireless communication unit 110 comprises an antenna 111. The wireless communication unit 110 can perform wireless communication in multiple types of communication system using the antenna 111, for example. The controller 100 controls the wireless communication of the wireless communication unit 110.

The wireless communication unit (a communication circuit) 110 can directly and wirelessly communicate with the other electronic apparatuses 10, the roadside units 5, and the vehicles 6. For example, the wireless communication unit 110 can communicate with the other electronic apparatuses 10, the roadside units 5, and the vehicles 6 using the communication bandwidth of 9 MHz in the 760 MHz band.

The wireless communication unit 110 may wirelessly communicate with a base station of a mobile phone system. The wireless communication unit 110 can communicate with, for example, a mobile phone different from the electronic apparatus 10 and a web server, through the base station and a network such as the Internet. The wireless communication unit 110 can also communicate with an access point in a wireless LAN. The wireless communication unit 110 can communicate with, for example, the mobile phone different from the electronic apparatus 10 and the web server, via this access point and the network such as the Internet. The electronic apparatus 10 can perform, for example, data communication and make an audio call and a video call with another mobile phone.

The wireless communication unit 110 performs various processes, for example, an amplification process on a signal received via the antenna 111 to output the resulting reception signal to the controller 100. The controller 100 performs various processes on the reception signal to be input, to acquire information contained in the reception signal. The controller 100 outputs a transmission signal containing the information to the wireless communication unit 110. The wireless communication unit 110 performs the various processes, for example, the amplification process on the transmission signal to be input, to wirelessly transmit the resulting transmission signal from the antenna 111.

The display 120 comprises the display region 12 located on the front surface of the electronic apparatus 10, and a display panel 121. The display 120 can display various pieces of information in the display region 12. The display panel 121 is, for example, a liquid-crystal display panel or an organic EL panel. Under the control of the controller 100, the display panel 121 can display various pieces of information such as characters, symbols, and graphics. The display panel 121 faces the display region 12 in the apparatus case 11. The information displayed on the display panel 121 is displayed in the display region 12.

The touch panel 130 can detect operations performed on the display region 12 by an operator such as the finger. The touch panel 130 is, for example, a projected capacitive touch panel. The touch panel 130 is located on, for example, the backside of the display region 12. When the user 9 performs an operation on the display region 12 using an operator such as the finger, the touch panel 130 can output, to the controller 100, an electrical signal corresponding to the operation. The controller 100 can identify the details of the operations performed on the display region 12, based on the electrical signal (an output signal) from the touch panel 130. The controller 100 can then perform processes corresponding to the identified operation details.

In response to an operation performed by the user 9, each of the operation buttons 22 of the operation button group 220 can output, to the controller 100, an operation signal indicating that the operation button 22 has been operated. The controller 100 can accordingly determine whether the operation button 22 has been operated. The controller 100 that has received the operation signal controls the other components, so that the electronic apparatus 10 executes a function allocated to the operated operation button 22.

The satellite signal receiver 140 can receive a satellite signal to be transmitted from a positioning satellite. The satellite signal receiver 140 can then acquire position information about the electronic apparatus 10 on the basis of the received satellite signal. This position information contains, for example, the latitude and longitude indicating a position of the electronic apparatus 10. The controller 100 can operate the satellite signal receiver 140 and stop the operations thereof. The satellite signal receiver 140 is considered also as a position information acquiring unit that acquires position information indicating the position of the electronic apparatus 10.

The satellite signal receiver 140 is, for example, a GPS receiver, and can receive a wireless signal from a positioning satellite of the Global Positioning System (GPS). The satellite signal receiver 140 calculates the current position of the electronic apparatus 10, for example, in latitude and longitude on the basis of the received wireless signal, and outputs position information including the calculated latitude and longitude to the controller 100. The position information of the electronic apparatus 10 is considered as the position information of the user 9 carrying the electronic apparatus 10.

The satellite signal receiver 140 may find the position information of the electronic apparatus 10, based on a signal from a positioning satellite of the Global Navigation Satellite System (GNSS) other than the GPS. The satellite signal receiver 140 may find the position information of the electronic apparatus 10 based on a signal from a positioning satellite of, for example, the Global Navigation Satellite System (GLONASS), the Indian Regional Navigational Satellite System (IRNSS), the COMPASS, the Galileo, or the Quasi-Zenith Satellite System (QZSS).

The position information about the electronic apparatus 10 does not necessarily have to be acquired based on a wireless signal from a positioning satellite. For example, upon receiving signals from a plurality of base stations, the position information acquiring unit may acquire the current position on the basis of the received signals. For example, the position information acquiring unit may determine, as the position of the electronic apparatus 10, a position within a region in which wireless-communication zones of the plurality of base stations overlap one another. In this case, for example, the controller 100 implements the functions of the position information acquiring unit.

The electronic apparatus 10 may use the first camera 180 or the second camera 190 to acquire the position information. Specifically, the electronic apparatus 10 acquires a landscape image around the electronic apparatus 10 which includes a building, a facility, a traffic sign, advertising signage, a placard, or a plant, through the first camera 180 or the second camera 190. The electronic apparatus 10 may perform image analysis on the acquired landscape image, and acquire the current position of the electronic apparatus 10 based on the features identified through the image analysis. For example, the electronic apparatus 10 may query, through the wireless communication unit 110, a cloud server about a place matching the features identified through the image analysis. The cloud server manages, in association with one another, the position information such as the latitude and longitude and features of the landscape image in a place corresponding to the position information. The electronic apparatus 10 may receive, from the cloud server, the position information corresponding to the place matching the features identified through the image analysis. The electronic apparatus 10 may determine the current position based on the position information received from the cloud server. The electronic apparatus 10 may also acquire the landscape image around the electronic apparatus 10 via the wireless communication unit 110 from, for example, an eyeglass-type wearable terminal equipped with a camera that the user 9 is wearing, or a street camera near the user 9.

The microphone 170 can convert a sound received from outside the electronic apparatus 10 into an electrical audio signal (referred to as audio information) and output this audio signal to the controller 100. The sound from outside the electronic apparatus 10 is taken inside the electronic apparatus 10 from the microphone hole 15 to be input to the microphone 170.

The speaker 160 is, for example, a dynamic speaker. The speaker 160 can convert the electrical audio signal sent from the controller 100, into a sound and output this sound to the outside. The sound from the speaker 160 is output from the speaker hole 14 to the outside. The user 9 can hear the sound emitted from the speaker hole 14 even at a place away from the electronic apparatus 10.

The receiver 150 can output a received sound. The receiver 150 is, for example, a dynamic speaker. The receiver 150 can convert the electrical audio signal sent from the controller 100, into a sound and output this sound to the outside. The sound from the receiver 150 is output from the receiver hole 13 to the outside. The volume of the sound output from the receiver hole 13 is smaller than the volume of the sound from the speaker hole 14. The user 9 can hear the sound output from the receiver hole 13 by bringing his/her ear close to the receiver hole 13. A vibration element which vibrates a portion on the front surface of the apparatus case 11 such as a piezoelectric vibration element may replace the receiver 150. In this case, sound is transmitted to a user through the vibration of the portion on the front surface. The receiver hole 13 is thus unnecessary.

The first camera 180 comprises the lens 181 and an image sensor. The second camera 190 comprises the lens 191 and an image sensor. Each of the first camera 180 and the second camera 190 can capture the image of an object under the control of the controller 100, generate a static image or a dynamic image that indicates the captured object, and output this image to the controller 100.

The lens 181 of the first camera 180 is visible from the front surface 11*a* of the apparatus case 11. The first camera 180 can thus capture the image of an object disposed on the front surface side (the display region 12 side) of the electronic apparatus 10. The first camera 180 is called an in-camera. The lens 191 of the second camera 190 is visible from the back surface 11*b* of the apparatus case 11. The second camera 190 can thus capture the image of an object disposed on the back surface side of the electronic apparatus 10. The second camera 190 is called an out-camera.

The acceleration sensor 200 can detect the acceleration of the electronic apparatus 10, and output acceleration information indicating the detected acceleration to the controller 100. The acceleration sensor 200 is, for example, a three-axis acceleration sensor. The acceleration sensor 200 can detect the acceleration of the electronic apparatus 10 in x-axis direction, y-axis direction, and z-axis direction. The x-axis direction, the y-axis direction, and the z-axis direction are set to, for example, the longer-side direction, the shorter-side direction, and the depth direction of the electronic apparatus 10, respectively.

The atmospheric-pressure sensor 210 can detect the atmospheric pressure around the electronic apparatus 10, and output atmospheric-pressure information indicating the detected atmospheric pressure to the controller 100. The electronic apparatus 10 may comprise a sensor other than the acceleration sensor 200 and the atmospheric-pressure sensor 210. For example, the electronic apparatus 10 may comprise at least one of an azimuth sensor, a proximity sensor, an illumination sensor, and a gyro sensor.

The battery 230 can output power of the electronic apparatus 10. The battery 230 is, for example, a rechargeable battery. The power output from the battery 230 is supplied to the various components of the electronic apparatus 10 such as the controller 100 and the wireless communication unit 110.

Figure 5:
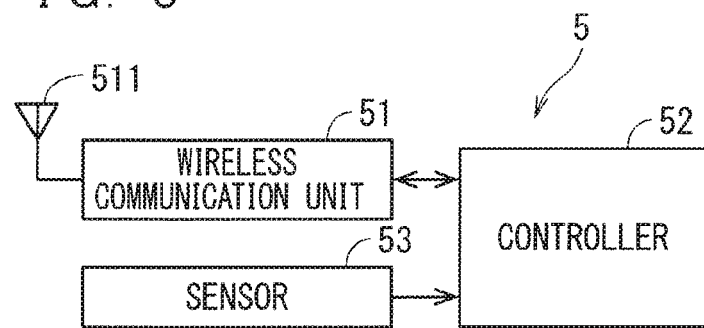
FIG. 5 illustrates a block diagram schematically showing one example electrical configuration of a roadside unit.

The configuration of the roadside unit 5 will be simply described before describing the specific functions and operations of the controller 100 of the electronic apparatus 10. FIG. 5 illustrates a block diagram schematically showing one example electrical configuration of the roadside unit 5. The roadside unit 5 comprises a wireless communication unit (a communication circuit) 51, a controller 52, and a sensor 53.

The wireless communication unit 51 comprises an antenna 511. The wireless communication unit 51 can wirelessly communicate via the antenna 511. The controller 52 controls the wireless communication of the wireless communication unit 51. The wireless communication unit 51 can directly and wirelessly communicate with the other roadside units 5, the vehicles 6, and the electronic apparatuses 10. The wireless communication unit 51 can communicate with the other roadside units 5, the vehicles 6, and the electronic apparatuses 10, for example, using the communication bandwidth of 9 MHz in the 760 MHz band.

The wireless communication unit 51 performs various processes, for example, an amplification process on a signal received via the antenna 511 to output the resulting reception signal to the controller 52. The controller 52 performs various processes on the reception signal to be input, to acquire information contained in the reception signal. The controller 52 outputs a transmission signal containing the information to the wireless communication unit 51. The wireless communication unit 51 performs the various processes, for example, the amplification process on the transmission signal to be input, to wirelessly transmit the resulting transmission signal from the antenna 511.

The sensor 53 can detect a person (e.g., a walker (a pedestrian), a runner, and a cyclist). One example aspect using a pedestrian as a detection target will be described hereinafter.

This sensor 53 can detect, for example, a pedestrian who crosses the pedestrian crossing 3. The sensor 53 may comprise a camera. The camera is installed to capture the image of the pedestrian crossing 3. The sensor 53 may include an image analysis function for performing image analysis on imaging data (an image) captured by the camera. The sensor 53 can determine the presence or absence of a person in the pedestrian crossing 3 through the image analysis. Any method may be used as a method for detecting a person through image analysis. For example, a feature volume (e.g., an HOG feature volume) is retrieved from the imaging data, and a person is distinguished from the others based on this feature volume. Machine learning, for example, Support Vector Machine (SVM) may be used for this distinction.

The sensor 53 may comprise a pair of cameras (i.e., a stereo camera). These cameras are disposed adjacent to each other. The imaging data from the pair of cameras will also be referred to as a stereo image. The sensor 53 can generate the image data with a depth by finding relevant pixels between pieces of imaging data, and thus increase the accuracy of detecting a pedestrian.

The image analysis function may be incorporated into the controller 52. Here, the camera and a part of the controller 52 form the sensor 53.

The sensor 53 may comprise three-dimensional radar. The three-dimensional radar comprises a light source and a light receiver. The light source emits light to a measurement target range. The light receiver comprises, for example, a plurality of photoreceptors arranged in a grid pattern. Each of the photoreceptors receives the light reflected from an object in the measurement target range. The sensor 53 may include an image generating function of finding a distance between the object and the three-dimensional radar using, for example, the time-of-flight (TOF) method to generate a three-dimensional image representing this distance using an image. The sensor 53 may also include an image analysis function of analyzing a three-dimensional image. The sensor 53 performs the image analysis on a three-dimensional image to determine the presence or absence of a pedestrian in, for example, a pedestrian crossing. Any method may be used as this image analysis method. For example, a feature volume may be found from a three-dimensional image, and a person may be distinguished from the others based on this feature volume. The image generating function and the image analysis function may be incorporated into the controller 52.

The sensor 53 may comprise millimeter wave radar. The millimeter wave radar comprises, for example, a transmitter that transmits electromagnetic waves referred to as millimeter waves to a measurement target range, and a receiver that receives the millimeter waves reflected from an object (reflected waves). The sensor 53 may include an analysis function of analyzing the millimeter waves received by the receiver. The sensor 53 may determine the presence or absence of a person in the pedestrian crossing 3 based on the analysis on the millimeter waves. As an example simple process, the sensor 53 may store reflected waves in the absence of a pedestrian, and detect a pedestrian upon receipt of a reflected wave different from these reflected waves. The sensor 53 may distinguish between a pedestrian and a vehicle based on the intensities of reflected waves. This is because the intensity of the reflected wave from a pedestrian is normally smaller than the intensity of the reflected wave from a vehicle. The analysis function on millimeter waves may be incorporated into the controller 52.

The one sensor 53 may detect pedestrians in all the pedestrian crossings 3. Alternatively, a plurality of the sensors 53 corresponding to the plurality of pedestrian crossings 3 may be installed so that each of the sensors 53 may detect a pedestrian in a corresponding one of the pedestrian crossings 3. The sensor 53 may comprise at least two of a camera, the three-dimensional radar, and the millimeter wave radar.

The controller 52 can manage the overall operations of the roadside unit 5. Since the hardware configuration of the controller 52 is the same as that of the controller 100, the repeated description is avoided.

The controller 52 can transmit a signal SB1 to surrounding objects through the wireless communication unit 51 in point-to-multipoint communication (e.g., multicast). This signal SB1 contains notification information indicating a detection result of the sensor 53. As one specific example, the notification information contains pedestrian detection information and road alignment information. The pedestrian detection information contains identification information on the pedestrian crossing 3, and pedestrian presence/absence information corresponding to the identification information. The identification information is information for identifying each of the pedestrian crossings 3. For example, FIG. 1 illustrates the four pedestrian crossings 3 to each of which the identification information is set. The pedestrian presence/absence information is information indicating the presence or absence of a pedestrian in each of the pedestrian crossings 3.

The road alignment information is information on the shape and the position of the road 7 near the intersection 2 and information on the shape and the position of the pedestrian crossing 3, and contains, for example, information such as intersection routing information and pedestrian crossing information. The intersection routing information contains information on the number of the roads 7 connected to the intersection 2, and connection orientations of the roads 7 connected to the intersection 2.

The pedestrian crossing information contains the identification information on each of the pedestrian crossings 3, and crossing area information indicating an area of each of the pedestrian crossings 3. Since the pedestrian crossing 3 often has a rectangular area in a plan view, the crossing area information on the pedestrian crossing 3 may be represented by, for example, positions of the four corners (the latitude and longitude).

The vehicle 6 receives the signal SB1 transmitted from the roadside unit 5. The vehicle 6 can notify the driver of the presence of a pedestrian, based on the pedestrian detection information contained in the signal SB1. The driver can recognize the presence of the pedestrian accordingly. During automated driving (e.g., automated driving categorized as levels 3 to 5 defined by the Society of Automotive Engineers (SAE) International in SAE J3016) of the vehicle 6, determination on whether to perform accident prevention control such as deceleration can be appropriately made, based on the received signal SB1 (e.g., the pedestrian detection information).

Next, the specific functions and operations of the controller 100 of the electronic apparatus 10 will be described. The controller 100 can transmit a signal SA1 to surrounding objects through the wireless communication unit 110 in point-to-multipoint communication (e.g., multicast). The controller 100 can incorporate various pieces of information into this signal SA1. The controller 100 may incorporate, for example, position information to be received from the satellite signal receiver 140 into this signal SA1. Consequently, the electronic apparatus 10 can notify the surrounding objects of its own position.

The vehicle 6 receives the signal SA1 transmitted from the electronic apparatus 10. In response to reception of the signal SA1, the vehicle 6 may notify the driver of the presence of the user 9. The driver can recognize the presence of the user 9 accordingly. During automated driving of the vehicle 6, the determination on whether to perform the accident prevention control such as deceleration can be appropriately made, based on the received signal SA1 (e.g., the position information of the user 9).

The controller 100 can directly receive the signal SB1 transmitted from the roadside unit 5, through the wireless communication unit 110. The controller 100 can determine whether to restrain transmission of the signal SA1, based on the signal SB1.

Figure 6:
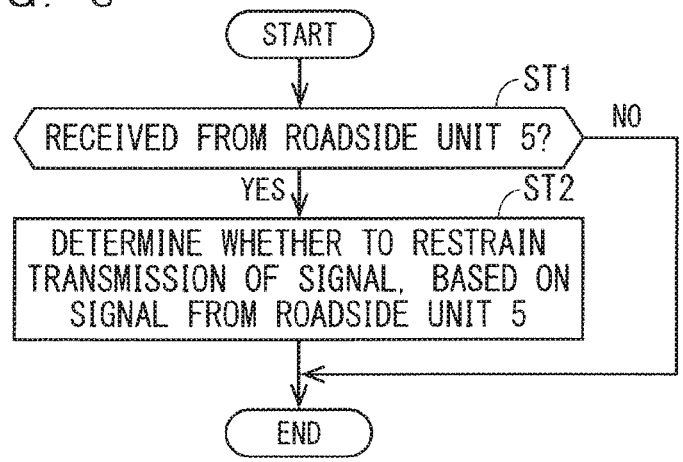
FIG. 6 illustrates a flowchart showing one example of operations of a controller of the electronic apparatus.

FIG. 6 illustrates a flowchart schematically showing one example of the operations of the electronic apparatus 10. A series of these processes in FIG. 6 is executed, for example, at predetermined time intervals. First in Step ST1, the controller 100 determines whether the signal SB1 has been received from the roadside unit 5. When determining no reception of the signal SB1, the controller 100 ends the processes. When determining the reception of the signal SB1, the controller 100 determines whether to restrain transmission of the signal SA1, based on the signal SB1 in Step ST2.

Figure 7:
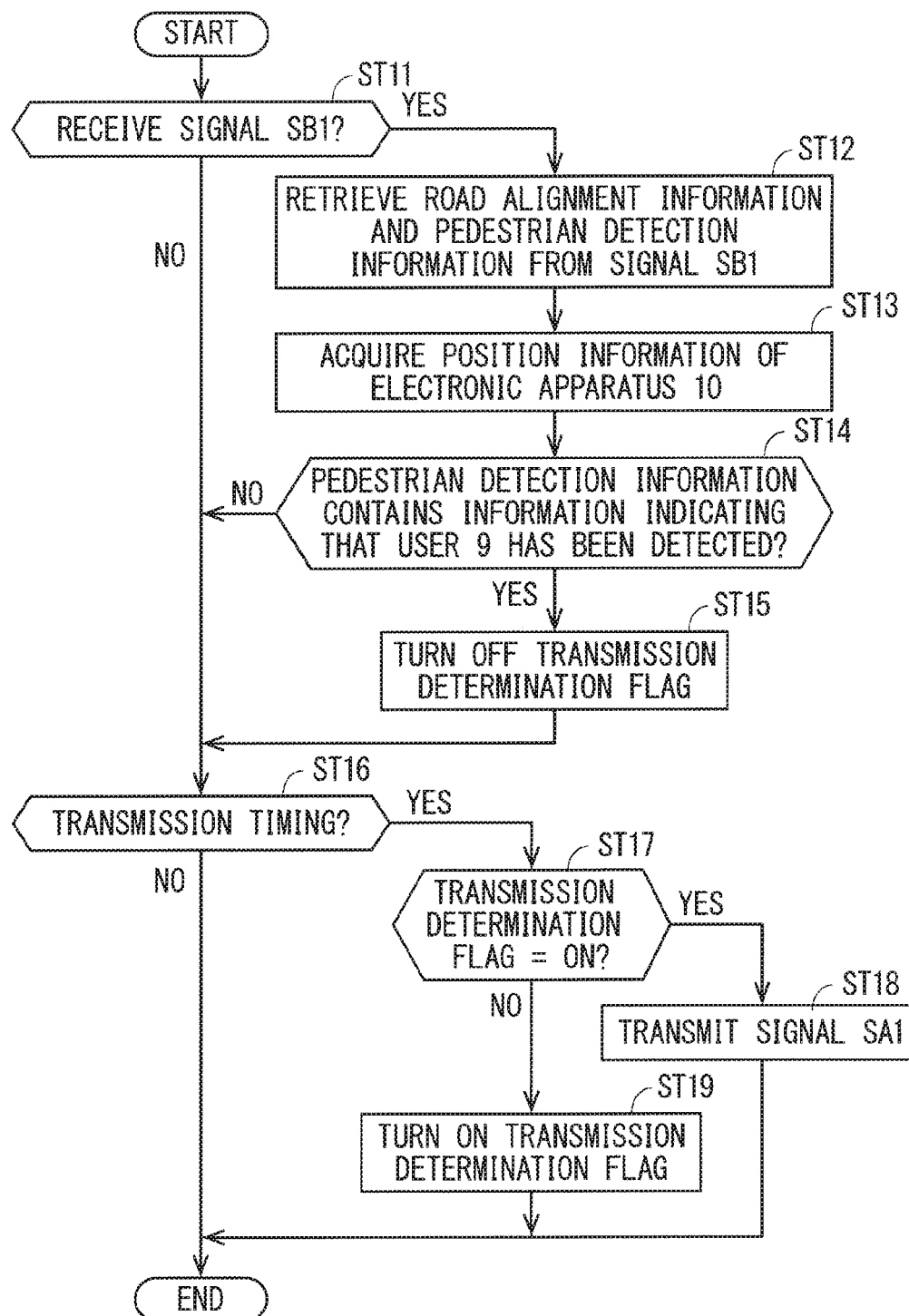
FIG. 7 illustrates a flowchart showing one example of operations of the controller of the electronic apparatus.

FIG. 7 illustrates a flowchart showing one example of the further specific operations of the electronic apparatus 10. A series of these processes in FIG. 7 is executed, for example, at predetermined time intervals. In this series of processes, a transmission determination flag F1 is used. This transmission determination flag F1 is initially ON, and stored in the storage 103.

First in Step ST11, the controller 100 determines whether the signal SB1 has been received from the roadside unit 5.

When determining no reception of the signal SB1, the controller 100 determines whether the current point in time is the transmission timing of the signal SA1 in Step ST16. For example, when an elapsed time from the previous transmission timing of the signal SA1 exceeds a predetermined time (e.g., approximately 100 [ms]), the controller 100 may determine that the current point in time is the transmission timing of the signal SA1. Although the signal collision avoidance technology such as the carrier sense multiple access/collision avoidance (CSMA/CA) is used in reality for determining the transmission timing, this is not the essence of the present application. Thus, the description is omitted.

When determining that the current point in time is not the transmission timing of the signal SA1, the controller 100 ends the processes. When determining that the current point in time is the transmission timing of the signal SA1, the controller 100 determines whether the transmission determination flag F1 is ON in Step ST17. When determining that the transmission determination flag F1 is ON, the controller 100 transmits the signal SA1 through the wireless communication unit 110 in point-to-multipoint communication (e.g., multicast) in Step ST18. For example, the controller 100 may incorporate the position information indicating the position of the electronic apparatus 10 into the signal SA1, and transmit the signal SA1. Then, the controller 100 ends the processes.

Since it is not known whether the roadside unit 5 has detected the user 9 when the controller 100 determines no reception of the signal SB1, the electronic apparatus 10 transmits the signal SA1 to actively notify the surrounding objects of the presence of the user 9. This enables the driving safety support communication system 1 to improve the traffic safety.

When determining the reception of the signal SB1 in Step ST11, the controller 100 retrieves the notification information (specifically, the road alignment information and the pedestrian detection information) from the signal SB1 in Step ST12.

Next in Step ST13, the controller 100 acquires the position information indicating the position of the electronic apparatus 10 from the position information acquiring unit (e.g., the satellite signal receiver 140).

Next in Step ST14, the controller 100 determines whether the notification information contains the information indicating that the user 9 has been detected. In other words, the controller 100 determines whether the roadside unit 5 has detected the user 9. Specifically, the controller 100 first acquires the crossing area information on the pedestrian crossing 3 in which a pedestrian has been detected (hereinafter referred to as a detected pedestrian crossing), based on the road alignment information and the pedestrian presence/absence information. The crossing area information indicating this detected pedestrian crossing is information indicating a detected place at which the pedestrian has been detected.

The controller 100 determines whether the user 9 is located at the detected pedestrian crossing 3, based on the position information of the electronic apparatus 10 and the crossing area information. When determining that the user 9 is not located at the detected pedestrian crossing, it is possible to determine that the roadside unit 5 does not detect the user 9. When determining that the user 9 is located at the detected pedestrian crossing, it is possible to determine that the roadside unit 5 has detected the user 9 and notifies the detection result to the surrounding objects via the signal SB1.

When making a negative determination in Step ST14, the controller 100 performs the process in Step ST16. When determining that the current point in time is the transmission timing in Step ST16, the controller 100 performs the process of making a determination on the transmission determination flag F1 in Step ST17. Since there is no change in the transmission determination flag F1, the controller 100 determines that the transmission determination flag F1 is on in Step ST17, and transmits the signal SA1 in Step ST18.

As described above, when determining that the notification information does not contain the information indicating that the user 9 has been detected, the electronic apparatus 10 transmits the signal SA1 to actively notify the surrounding objects of the presence of the user 9 because the roadside unit 5 does not detect the user 9. This enables the driving safety support communication system 1 to improve the traffic safety.

When making an affirmative determination in Step ST14, the controller 100 turns off the transmission determination flag F1 in Step ST15. Next, the controller 100 performs the process in Step ST16. When determining that the current point in time is the transmission timing in Step ST16, the controller 100 performs the process of making a determination on the transmission determination flag F1 in Step ST17. Since the transmission determination flag F1 is off after execution of the process in Step ST15, the controller 100 determines that the transmission determination flag F1 is off in Step ST17. Here, the controller 100 turns on the transmission determination flag F1 and ends the processes in Step ST19, without executing Step ST18.

In the aforementioned processes, the electronic apparatus 10 does not transmit the signal SA1 when the notification information contains the information indicating that the user 9 has been detected (Steps ST14 and ST15). In other words, since the roadside unit 5 detects the user 9 and notifies the detection result to surrounding objects, the electronic apparatus 10 does not transmit the signal SA1. Consequently, the communication volume of the driving safety support communication system 1 can be reduced while the roadside unit 5 notifies the presence of the user 9 to the surrounding objects. Thus, the other devices can be easily communicated, and a signal with a priority higher than the signal SA1 can be transmitted. When the roadside units 5, the vehicles 6, and the electronic apparatuses 10 communicate with one another at a low communication speed (e.g., with a few number of channels), the reduction in the communication volume of the electronic apparatuses 10 is particularly important.

In the specific example, the controller 100 does not transmit the signal SA1 when the notification information from the roadside unit 5 contains the information indicating that the user 9 has been detected. However, a method for restraining transmission of the signal SA1 is not limited to this. For example, the controller 100 may restrain transmission of the signal SA1 by increasing transmission intervals (time intervals) of the signal SA1. In other words, when receiving, from the roadside unit 5, the notification information containing the information indicating that the user 9 has been detected, the controller 100 may transmit the signal SA1 at transmission intervals longer than transmission intervals (will be referred to as normal transmission intervals) of the signal SA1 upon no reception of the notification information. The controller 100 may restrain transmission of the signal SA1 by, for example, reducing the information volume of data to be transmitted via the signal SA1. In other words, when receiving, from the roadside unit 5, the notification information containing the information indicating that the user 9 has been detected, the controller 100 may change the data to be transmitted via the signal SA1 into data with less information volume than that of the data upon no reception of the notification information. When receiving, from the roadside unit 5, the notification information containing the information indicating that the user 9 has been detected, the controller 100 may convert, through a compression process, etc., the data to be transmitted via the signal SA1 into the data with less information volume than that of the data upon no reception of the notification information.

Figure 8:
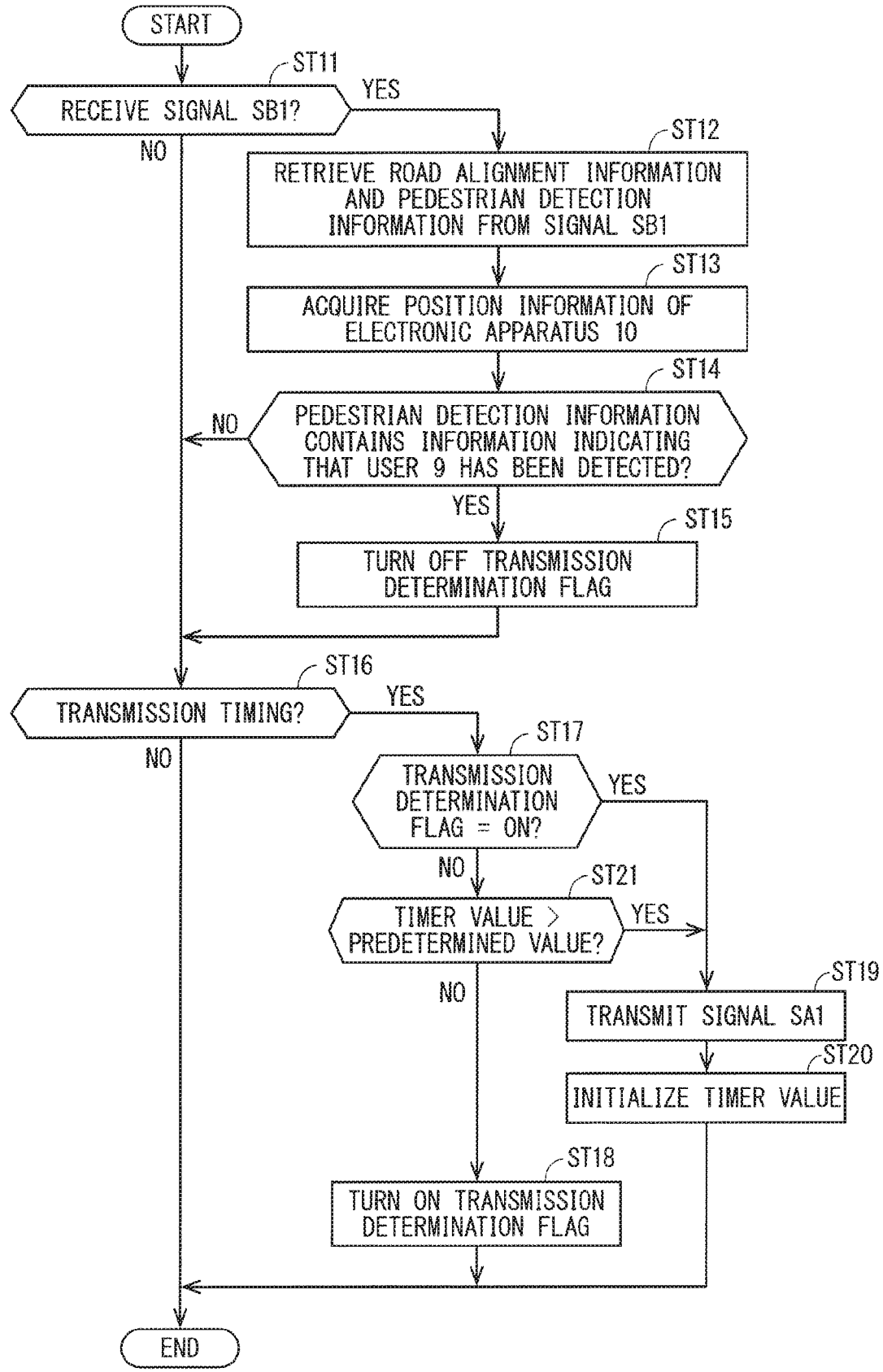
FIG. 8 illustrates a flowchart showing one example of operations of the controller of the electronic apparatus.

FIG. 8 illustrates a flowchart showing one example of the operations of the controller 100. Here, the controller 100 includes a timer function. The controller 100 increments a timer value based on the elapsed time. In comparison with FIG. 7, processes of Steps ST20 and ST21 are further performed. The process of Step ST20 is performed after the process of ST19. In Step ST20, the controller 100 initializes the timer value to zero, and ends the processes. In other words, the timer value is initialized for each transmission of the signal SA1.

The process of Step ST21 is performed when the controller 100 determines in Step ST17 that the transmission determination flag F1 is off. In this Step ST21, the controller 100 determines whether the timer value is larger than a predetermined value. The predetermined value is, for example, predefined, and is set longer than the normal transmission intervals. When determining that the timer value is longer than the predetermined value, the controller 100 performs the process of Step ST19. When determining that the timer value is shorter than the predetermined value, the controller 100 performs the process of Step ST18 without performing the processes of Steps ST19 and ST20.

In a series of these processes, the controller 100 transmits the signal SA1 after a lapse of a predetermined duration from the previous transmission of the signal SA1 even when the transmission determination flag F1 is off. Further, this predetermined duration is longer than the normal transmission intervals of the signal SA1. Thus, the communication volume of the driving safety support communication system 1 can be reduced. Moreover, since the electronic apparatus 10 actively transmits the position of the user 9 to the surrounding objects, the traffic safety can be improved.

Although the example where the sensor 53 detects a person in the pedestrian crossing 3 is described above, the operations are not necessarily limited thereto. In other words, the roadside unit 5 may detect a person, and transmit the detection result (including the detected place). Then, the electronic apparatus 10 may determine whether the roadside unit 5 has detected the user 9, based on the detection result, and restrain transmission of the signal SA1 when determining that the roadside unit 5 has detected the user 9.

Embodiment 2

The configuration of the driving safety support communication system 1 according to Embodiment 2 is the same as that according to Embodiment 1. Embodiment 2 differs from Embodiment 1 by the conditions for restraining transmission of the signal SA1, which will be specifically described below.

The controller 52 of the roadside unit 5 can set an area for restraining transmission of the signal SA1 (will be hereinafter referred to as a restraining area) by the electronic apparatus 10, incorporate, into the signal SB1, restraining area information indicating the restraining area, and transmit the signal SB1 to the electronic apparatus 10.

Figure 9:
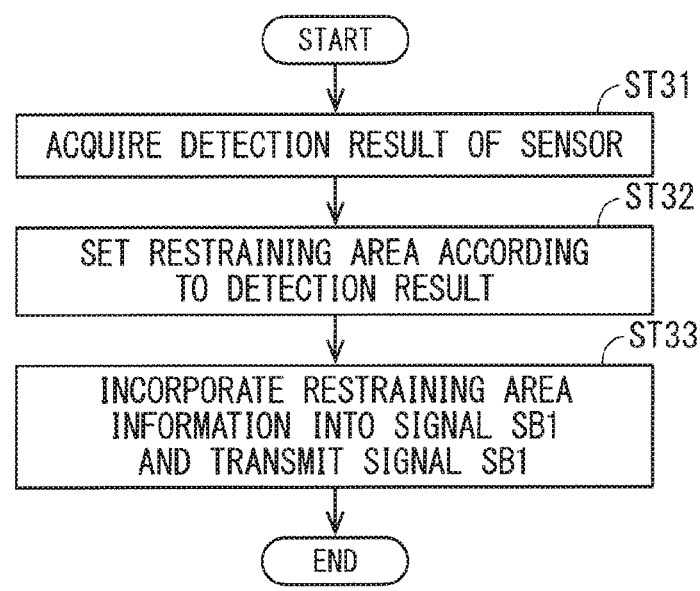
FIG. 9 illustrates a flowchart showing one example of operations of a controller of the roadside unit.

FIG. 9 illustrates a flowchart showing one example of the operations of the controller 52. A series of these processes is executed, for example, at predetermined time intervals.

In Step ST31, the controller 52 acquires a detection result of the sensor 53. This sensor 53 can detect the vehicle 6 in a detection area. The sensor 53 comprises, for example, a camera which captures an image of a detection area including the intersection 2 (will be hereinafter referred to as a vehicle detection area). The vehicle detection area covers, for example, the intersection 2, and a predetermined range portion of the roads 7 with respect to the intersection 2. Vehicle detection area information indicating this vehicle detection area is prestored in the storage 103. The vehicle detection area information may be represented by, for example, information on the latitude and longitude.

The sensor 53 may include an image analysis function for performing image analysis on imaging data (an image) captured by the camera. The sensor 53 can determine the presence or absence of the vehicle 6 in the intersection 2 and each of the roads 7 through the image analysis. Any method may be used as a method for detecting a vehicle through image analysis. For example, a feature volume is retrieved from the imaging data, and the vehicle 6 is distinguished from the others based on this feature volume. Machine learning may be used for this distinction.

The image analysis function may be incorporated into the controller 52. Here, the camera and a part of the controller 52 form the sensor 53.

Next in Step ST32, the controller 52 sets a restraining area based on the detection result of the sensor 53. Specifically, the controller 52 sets, to the restraining area, a vehicle detection area or an area inside the contour of the vehicle detection area when the sensor 53 does not detect the vehicle 6 in the vehicle detection area. In other words, the traffic safety is hardly compromised in a vehicle detection area in the absence of the vehicle 6, even when the electronic apparatus 10 does not notify the presence of the user 9 to the surrounding objects. Thus, the controller 100 sets, to the restraining area, the vehicle detection area or an area inside the contour of the vehicle detection area. Adoption of the area inside the contour of the vehicle detection area as the restraining area can ensure higher traffic safety.

Next in Step ST33, the controller 52 incorporates the restraining area information indicating a restraining area into the signal SB1, and transmits this signal SB1 to the electronic apparatus 10 to end the processes.

Figure 10:
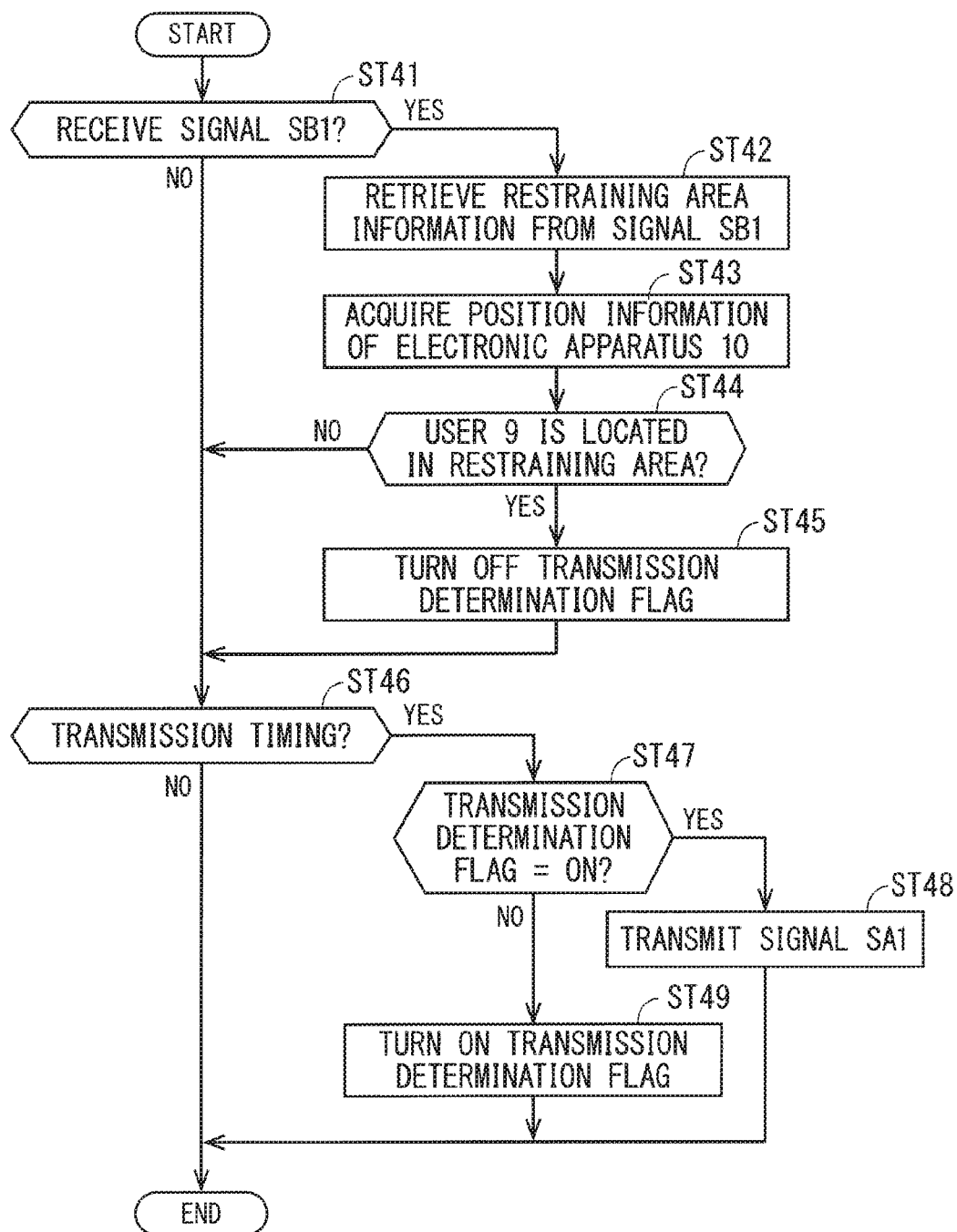
FIG. 10 illustrates a flowchart showing one example of operations of the controller of the electronic apparatus.

FIG. 10 illustrates a flowchart showing one example of the operations of the electronic apparatus 10. A series of these processes is executed, for example, at predetermined time intervals. The processes in Step ST41, ST43 and ST45 to ST49 are identical to those in Step ST11, ST13 and ST15 to ST19, respectively. The process in Step ST42 is performed when the electronic apparatus 10 determines the reception of the signal SB1 in Step ST41. In Step ST42, the controller 100 retrieves the restraining area information from the signal SB1. The process of Step ST44 is performed after the process of ST43. In Step ST44, the controller 100 determines whether the user 9 is located in the restraining area, based on the position information acquired in Step ST43 and the restraining area information retrieved in Step ST42.

When determining that the user 9 is located in the restraining area in Step ST44, the controller 100 performs the process in Step ST45 and then the process in Step ST46. When determining that the user 9 is not located in the restraining area in Step ST44, the controller 100 performs the process in Step ST46 without performing the process in Step ST45.

In a series of these processes, the controller 100 restrains transmission of the signal SA1 when the user 9 is located in the restraining area (Steps ST44 and ST45). Consequently, the communication volume of the driving safety support communication system 1 can be reduced while decrease in the traffic safety is restrained or avoided. Moreover, reduction in the unnecessary transmission can reduce the power consumption of the electronic apparatus 10.

When the electronic apparatus 10 cannot acquire the restraining area information (NO in Step ST41) or when the controller 100 determines that the user 9 is not located in the restraining area (NO in Step ST44), the controller 100 transmits the signal SA1 at the transmission timing. Since the electronic apparatus 10 can notify the presence of the user 9 to the surrounding objects, the traffic safety can be improved.

In the aforementioned example, the sensor 53 comprises a camera, which is not necessarily limited thereto. Similarly as those for the pedestrian detection, the sensor 53 may comprise the three-dimensional radar or the millimeter wave radar, or at least two of the camera, the three-dimensional radar, and the millimeter wave radar.

When the controller 52 does not receive the signal from the vehicle 6 over a predetermined period of time, it may determine that the vehicle 6 cannot detect the roads 7. Here, the wireless communication unit 51 and the controller 52 function as the sensor 53. In this case, the detection area is, for example, an area as wide as the wireless-communication zone of the vehicle 6 and an area centered on the roadside unit 5.

In other words, when the vehicle 6 cannot be detected in the detection area, the controller 100 may set, to the restraining area, the detection area or an area inside the contour of the detection area.

The controller 52 may acquire information indicating whether the vehicle 6 can travel to the road 7 (will be hereinafter referred to as entry permission information). For example, when the road 7 is closed for construction, the vehicle 6 is prohibited from traveling to the road 7. The vehicle 6 is sometimes prohibited from traveling to the road 7 for a certain event during a predetermined prohibition period. The entry permission information contains such information indicating an area of the road 7 to which the entry is prohibited. The information indicating the area of the road 7 may be represented by, for example, information on the latitude and longitude. The entry permission information may contain information indicating a prohibition period. The controller 52 may receive this entry permission information from, for example, an external apparatus (e.g., a traffic control center) via wires or wirelessly.

Since the road 7 to which the vehicle 6 is prohibited from traveling is safe for the user 9, the necessity to notify the presence of the user 9 to the surrounding objects is low. Thus, the controller 52 may determine the presence or absence of the road 7 to which the vehicle 6 is prohibited from traveling, based on the entry permission information, and set the road 7 to the restraining area when determining the presence of the road 7 to which the vehicle 6 is prohibited from traveling.

Figure 11:
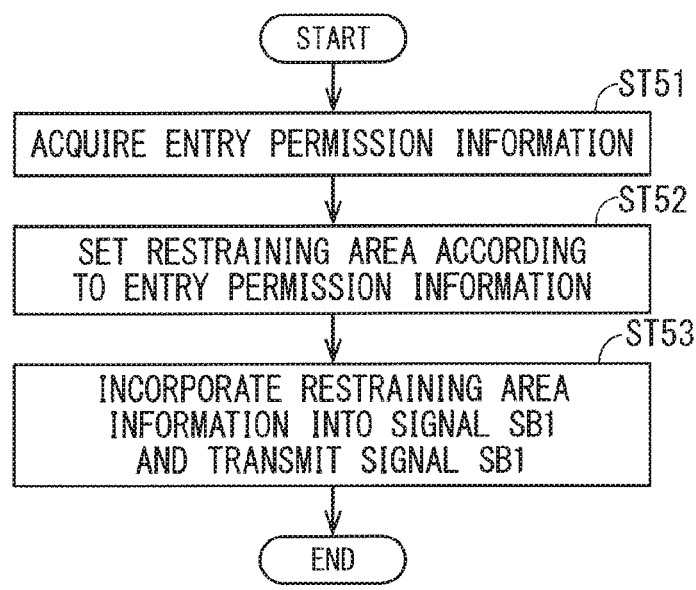
FIG. 11 illustrates a flowchart showing one example of operations of the controller of the roadside unit.

FIG. 11 illustrates a flowchart showing one example of the operations of the controller 52. A series of these processes is executed, for example, at predetermined time intervals. In Step ST51, the controller 52 acquires the entry permission information from, for example, an external apparatus. Next in Step ST52, the controller 52 sets a restraining area based on the entry permission information. Specifically, the controller 52 sets the road 7 to which the vehicle 6 is prohibited from traveling to a restraining area. The controller 52 may determine whether the prohibition period includes the current time when the entry permission information contains information indicating the prohibition period, and set, to the restraining area, the road 7 to which the vehicle 6 is prohibited from traveling when the prohibition period includes the current time. Next in Step ST53, the controller 52 incorporates the restraining area information indicating the restraining area into the signal SB1, and transmits the signal SB1 through the wireless communication unit 51 in point-to-multipoint communication (e.g., multicast).

When the user 9 is located in a travel prohibition area of the vehicle 6, the electronic apparatus 10 restrains transmission of the signal SA1. Thus, the communication volume of the driving safety support communication system 1 can be reduced while decrease in the traffic safety is restrained or avoided.

When the roadside unit 5 includes a function of detecting a person in a predetermined detection area (e.g., the pedestrian crossing 3) as described in Embodiment 1, the controller 52 may set the detection area to the restraining area.

The electronic apparatus 10 restrains transmission of the signal SA1 when the user 9 is located in the restraining area. Since the roadside unit 5 detects the user 9 in this restraining area, the traffic safety is reduced little even when the electronic apparatus 10 restrains transmission of the signal SA1. Thus, the communication volume of the driving safety support communication system 1 can be reduced by restraining the transmission of the signal SA1.

As described above, while an electronic apparatus, a roadside unit, a method for operating the electronic apparatus and the roadside unit, a control program, and a transport system are described in detail, the foregoing description is in all aspects illustrative and does not restrict this disclosure. The various modifications described above are applicable in combination unless any contradiction occurs. It is understood that numerous modifications that have not yet been exemplified can be devised without departing from the scope of this disclosure.

The invention claimed is:

1. An electronic apparatus, comprising:
   a communication unit configured to wirelessly communicate with a roadside unit and a vehicle; and
   at least one processor configured, when receiving through the communication unit a reception signal transmitted from the roadside unit, to determine whether to restrain transmission of a transmission signal through the communication unit, based on the reception signal,
   wherein the at least one processor acquires information indicating a road to which the vehicle is prohibited from traveling, and
   the at least one processor sets the road to a restraining area based on the information.

2. The electronic apparatus according to claim 1,
   wherein the roadside unit includes a function of detecting a person, and a function of transmitting the reception signal into which information indicating that the person has been detected is incorporated, in point-to-multipoint communication,
   the at least one processor determines whether the roadside unit has detected a user of the electronic apparatus, based on the reception signal, and
   the at least one processor restrains transmission of the transmission signal when determining that the roadside unit has detected the user.

3. The electronic apparatus according to claim 2, comprising
   a position information acquiring unit configured to acquire position information indicating a position of the electronic apparatus,
   wherein the reception signal contains information indicating a detected place at which the person has been detected,
   the at least one processor determines, based on the position information and the reception signal, whether the detected place covers the position of the electronic apparatus, and
   the at least one processor determines that the roadside unit has detected the user when determining that the detected place covers the position of the electronic apparatus.

4. The electronic apparatus according to claim 1, comprising
   a position information acquiring unit configured to acquire position information indicating a position of the electronic apparatus,
   wherein the reception signal contains restraining area information indicating the restraining area,
   the at least one processor determines, based on the position information and the restraining area information, whether the restraining area covers the position of the electronic apparatus, and
   the at least one processor restrains transmission of the transmission signal when determining that the restraining area covers the position of the electronic apparatus.

5. The electronic apparatus according to claim 2,
   wherein the at least one processor transmits the transmission signal when a result of the determination is negative.

6. The electronic apparatus according to claim 1,
   wherein the at least one processor transmits the transmission signal when determining no reception of the reception signal.

7. A roadside unit, comprising:
   a communication unit configured to wirelessly communicate with an electronic apparatus and a vehicle; and
   at least one processor configured to set a restraining area in which the electronic apparatus restrains transmission of a signal, and transmit restraining area information to the electronic apparatus through the communication unit, the restraining area information indicating the restraining area,
   wherein the at least one processor acquires information indicating a road to which the vehicle is prohibited from traveling, and
   the at least one processor sets the road to the restraining area based on the information.

8. The roadside unit according to claim 7, comprising
   a sensor configured to detect a person in a detection area,
   wherein the at least one processor transmits information through the communication unit,
   the information indicates a result of the detection by the sensor, and
   the at least one processor sets the detection area to the restraining area.

9. The roadside unit according to claim 7, comprising
   a sensor configured to detect a vehicle in a detection area,
   wherein the at least one processor sets an area to the restraining area when the sensor does not detect the vehicle in the detection area, and
   the area is identical to the detection area or is an area inside a contour of the detection area.

10. A transport system, comprising:
    an electronic apparatus; and
    a roadside unit, wherein
    the electronic apparatus comprises:
    a communication unit configured to wirelessly communicate with a roadside unit and a vehicle;
    at least one processor configured, when receiving through the communication unit a reception signal transmitted from the roadside unit, to determine whether to restrain transmission of a transmission signal through the communication unit, based on the reception signal; and a position information acquiring unit configured to acquire position information indicating a position of the electronic apparatus, the reception signal contains restraining area information indicating a restraining area, the at least one processor determines, based on the position information and the restraining area information, whether the restraining area covers the position of the electronic apparatus, the at least one processor restrains transmission of the transmission signal when determining that the restraining area covers the position of the electronic apparatus, the roadside unit comprises:
  a communication unit configured to wirelessly communicate with an electronic apparatus and a vehicle; and
  at least one processor configured to set a restraining area in which the electronic apparatus restrains transmission of a signal, and transmit restraining area information to the electronic apparatus through the communication unit, the restraining area information indicating the restraining area, the at least one processor of either the electronic apparatus or the roadside unit acquires information indicating a road to which the vehicle is prohibited from traveling, and the at least one processor of either the electronic apparatus or the roadside unit sets the road to a restraining area based on the information.

* * * * *